United States Patent
Bean et al.

(10) Patent No.: US 11,552,928 B2
(45) Date of Patent: Jan. 10, 2023

(54) REMOTE CONTROLLER SOURCE ADDRESS VERIFICATION AND RETENTION FOR ACCESS DEVICES

(71) Applicant: ARRIS Enterprises LLC, Suwanee, GA (US)

(72) Inventors: Janet T. Bean, Underhill, VT (US); Immanuel E. Anand, West Boylston, MA (US); Christopher W. Fox, Alpharetta, GA (US); David F. Baran, Haverford, PA (US); Michael J. Emmendorfer, Chesterfield, MO (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/517,009

(22) Filed: Nov. 2, 2021

(65) Prior Publication Data

US 2022/0141177 A1 May 5, 2022

Related U.S. Application Data

(60) Provisional application No. 63/108,754, filed on Nov. 2, 2020.

(51) Int. Cl.
*H04L 61/5014* (2022.01)
*H04L 45/021* (2022.01)
*H04L 45/655* (2022.01)
*H04L 45/00* (2022.01)

(52) U.S. Cl.
CPC ........ *H04L 61/5014* (2022.05); *H04L 45/021* (2013.01); *H04L 45/655* (2022.05); *H04L 45/66* (2013.01)

(58) Field of Classification Search
CPC . H04L 61/5014; H04L 45/021; H04L 45/655; H04L 45/66
See application file for complete search history.

(56) References Cited

U.S. PATENT DOCUMENTS

| | | | |
|---|---|---|---|
| 8,437,360 B2 * | 5/2013 | Singh | H04N 21/6118 709/225 |
| 9,100,206 B1 * | 8/2015 | Barth | H04L 45/308 |
| 9,654,331 B1 * | 5/2017 | Singh | H04L 61/5014 |
| 2011/0029645 A1 * | 2/2011 | Baykal | H04L 61/5046 709/221 |
| 2019/0222316 A1 * | 7/2019 | Williams | H02M 5/06 |

* cited by examiner

*Primary Examiner* — Patrice L Winder
(74) *Attorney, Agent, or Firm* — Chernoff, Vilhauer, McClung & Stenzel, LLP

(57) ABSTRACT

Systems and methods for source address verification and/or retention for access devices.

12 Claims, 4 Drawing Sheets

REMOTE CONTROLLER SOURCE ADDRESS VERIFICATION AND RETENTION FOR ACCESS DEVICES

CROSS REFERENCE TO RELATED APPLICATIONS

This application claims the benefit of U.S. Provisional Patent Application No. 63/108,754 filed Nov. 2, 2020.

BACKGROUND

The subject matter of this application relates to systems and methods that provide source address verification and/or retention for access devices.

What is colloquially referred to as the "Internet" is a large number of interconnected networks, each separately operated by a different Internet Service Provider (ISP). To enable the transfer of data among and within these different individual networks, each device connected to the larger Internet is given a unique IP address which identifies that connection's location. Thus, the purpose of the IP address is to identify the location in a network by which a device transmits data into the Internet and receives data from the Internet. Every ISP has a pool of IP addresses that they manage, and when a customer connects to their network with a modem, which is the connection point to the Internet from that customer, the modem is assigned an IP address.

A MAC (media access control) address, conversely, uniquely identifies a network device itself, regardless of the location or network to which it is connected. Thus, while IP addresses are assigned by ISPs and can be re-assigned as devices connect and disconnect, MAC addresses are tied to a physical network adapter and are assigned by manufacturers using a 12-bit hexadecimal identifier which provides over 281 trillion different combinations.

Since a MAC address uniquely identifies a network device, transfer of data to and from different devices connected through the Internet requires both the IP address (which identifies the network connection to the Internet) as well as the MAC address of the devices sending and receiving the data. For example, a home network may be connected to the Internet using an IP address assigned to a cable modem, but may also include several computers, printers, etc. that exchange data over the Internet. Thus, each MAC address of the individual devices in the network (including the modem) may all be associated with the IP address of the modem so that packets of data can be addressed to the destination device they are intended for.

Moreover, IP addresses are often assigned dynamically, meaning that when a device such as a cable modem or other gateway to a network connects to a network, it contacts a server, called a Dynamic Host Configuration Protocol (DHCP) server, which dynamically assigns an IP address to identify the connection of that device to the Internet. That address typically is assigned to the connected device until it disconnects; when it reconnects, it may be assigned a different IP address.

For each of these reasons, providers of network content not only need to discover and associate MAC addresses of various devices with the IP address ultimately used to connect those devices to the Internet, but also need to periodically update those associations since the IP addresses used to connect those devices to the Internet can change. Unfortunately, there is a limited number of IP addresses available.

What is desired, therefore, is a network system that reduces the number of IP addresses used.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
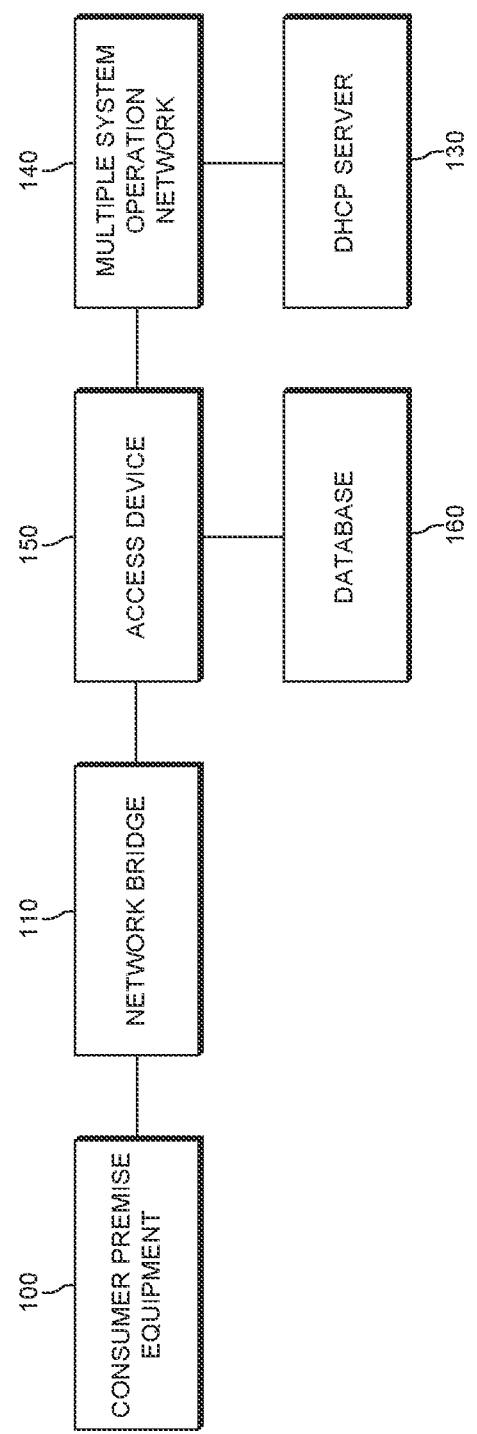
FIG. 1 illustrates a multiple system operator network together with an access device.

Referring to FIG. 1, a consumer premise device 100 such as a computer, a mobile phone, a router, a set top box, a wireless doorbell, or other computing device that includes a processor interconnects with the network bridge 110, such as cable modem, optical network unit, or otherwise, that provides bi-directional data communication across a network, typically to the Internet. When a network bridge 110 first connects to the Internet, it contacts a DHCP server 130 accessible through a multiple system operator network 140 (or any other suitable network, including a system operator network) with a message providing the DHCP server 130 with its MAC address and requesting assignment of an IP address. The DHCP server 130 responds accordingly with an IP address. The multiple system operator network 140 includes an associated access device 150 that snoops these DHCP messages to discover both the MAC address of the requesting network bridge and/or consumer premise equipment, and the IP address assigned to it by the DHPC server 130, and updates its in-memory database 160 with the discovered information. The database 160 generally includes information suitable to create a forwarding table (e.g., forwarding information base, MAC table, forwarding table) to identify the proper output network interface to which the input interface should forward a data packet. In this manner, the access device 150 may forward data from the consumer premise equipment 100 via the network bridge 110 to the desirable network interface of the multiple system operator network 140, and the access device 150 may forward data from multiple system operator network 140 to the desirable network interface for the consumer premise equipment 100 via the network bridge 110 and/or consumer premise equipment. The database 160 is dynamic in that is updates itself with updated information when the network bridge 110 and/or consumer premise equipment 100 obtains a new or updated IP address from the DHCP server 130. Further, when the access device 150 crashes, temporarily has a power interruption, is modified with updated software, or otherwise restarts, all of the data in the database 160 is lost. After a loss of the database 160, the access device 150 rebuilds its database (inclusive of the forwarding table) 160 by use of a DHCP leasequery protocol (e.g., RFC 4388 for IPv4) or a DHCP bulk leasequery protocol (e.g., RFC 6926 for IPv4) to query the DHCP server 130 to obtain the data for all of these leases that apply to the network bridge 110 and/or the consumer premise equipment 100 that access the network. In some embodiments, the access device 150 is integrated as part of a cable modem termination system, the access device 150 is included as part of a passive optical network optical line terminal, or otherwise the access device 150 is included within the system at any suitable location. Further, the system may support any of the DOCSIS protocols, such as DOCSIS 3.1 Security Specification, CM-SP-SECv3.1-I07-70111, if desired. The data traffic may go "through" the access device 150 which appears to be transparent to the consumer premise equipment 100, or otherwise, the access device 150 snoops a copy of the data traffic where the data traffic is not transparent at the access device 150. Accordingly, the access device 150 makes an association between the IP address assigned by the DHCP server 130 and the MAC address of the consumer premise equipment 100 and/or the network bridge 110, together with any additional information, as desired.

In this manner, the access device 150 typically creates an association between the MAC address of the consumer premise equipment 100, the IP address of the consumer premise equipment 100, and the MAC address of the optical network unit or the MAC address of the cable modem 110. In the case of an optical network unit, it registers itself to the network, which provides its MAC address, and the access device 150 may use this registered MAC address. In the case of a cable modem, its MAC address is provided to the DHCP server 130, and the access device 150 may use this MAC address included within the DHCP messaging. In addition, the data may include IP lease duration. For IPv6, the information may further include prefix delegation.

The access device 150, in addition to the building for the forwarding tables for traffic to and from the consumer premise equipment 100 and/or the network bridge 110, may also determine if a particular consumer premise equipment 100 and/or the network bridge 110 is allowed to access the network. If desired, the access device 150 may selectively block access to the network based upon the information, or lack thereof, in its database 160.

While restarting of the access device 150 includes the capability of dynamically rebuilding its forwarding table, the consumer premise equipment 100 and/or network bridge 110 during the rebuilding process still considers that it maintains a valid IP address. To support the DHCP requests the access device 150 maintains a set of host IP addresses.

To reduce the number of IP addresses used within a network by the network infrastructure so that additional IP addresses are available for the network bridges 110 and/or consumer premise equipment 100, it is desirable that the access device does not support all of the host IP addresses that would be otherwise required to support the DHCP leasequery protocol or the DHCP bulk leasequery protocol to query the DHCP server 130. Without the access device 150 including support for the DHCP leasequery protocol or the DHCP bulk leasequery protocol to query the DHCP serer 130, the access device 150 may reduce its configuration complexity, reduce its computational complexity, and reduce the need to consume a set of host IP addresses. Moreover, without the access device 150 including support for the DHCP leasequery protocol or the DHCP bulk leasequery protocol to query the DHCP server 130, the access device 150 inherently reduces the burden on the DHCP server 130 by not using the DHCP leasequery protocol or the DHCP bulk leasequery protocol to query the DHCP server 130.

Preferably, the access device does not support the IPv4 DHCP leasequery protocol (e.g., RFC 4388 for IPv4) or the IPv4 DHCP bulk leasequery protocol (e.g., RFC 6926 for IPv4), but may support an IPv6 DHCP leasequery protocol (e.g., RFC 5007 for IPv6) and an IPv6 DHCP bulk leasequery protocol (e.g., RFC 5460 for IPv6). In this manner, the access devices do not need to support all of the host IP addresses for IPv4 which are limited in number, but does support all of the host IP addresses for IPv6 which are not similarly limited in number. Alternatively, the access device may not support the IPv6 DHCP leasequery protocol (e.g., RFC 5007 for IPv6) nor the IPv6 DHCP bulk leasequery protocol (e.g., RFC 5460 for IPv6), although IPv6 host addresses may still be included in such a case with the access device. Typically, most consumer premise devices are IPv4 based. RFC 4388; RFC 6926; RFC 5007; and RFC 5460 are incorporated by reference herein in their entirety.

The DHCP leasequery protocol or the DHCP bulk leasequery protocol query are IP layer functions. The access device 150 preferably includes support for IPv6 host IP address to identify itself. The access device 150 preferably does not includes support for IPv4 host IP addresses to identify itself, so that such IPv4 host IP addresses remain available for other services.

Figure 2:
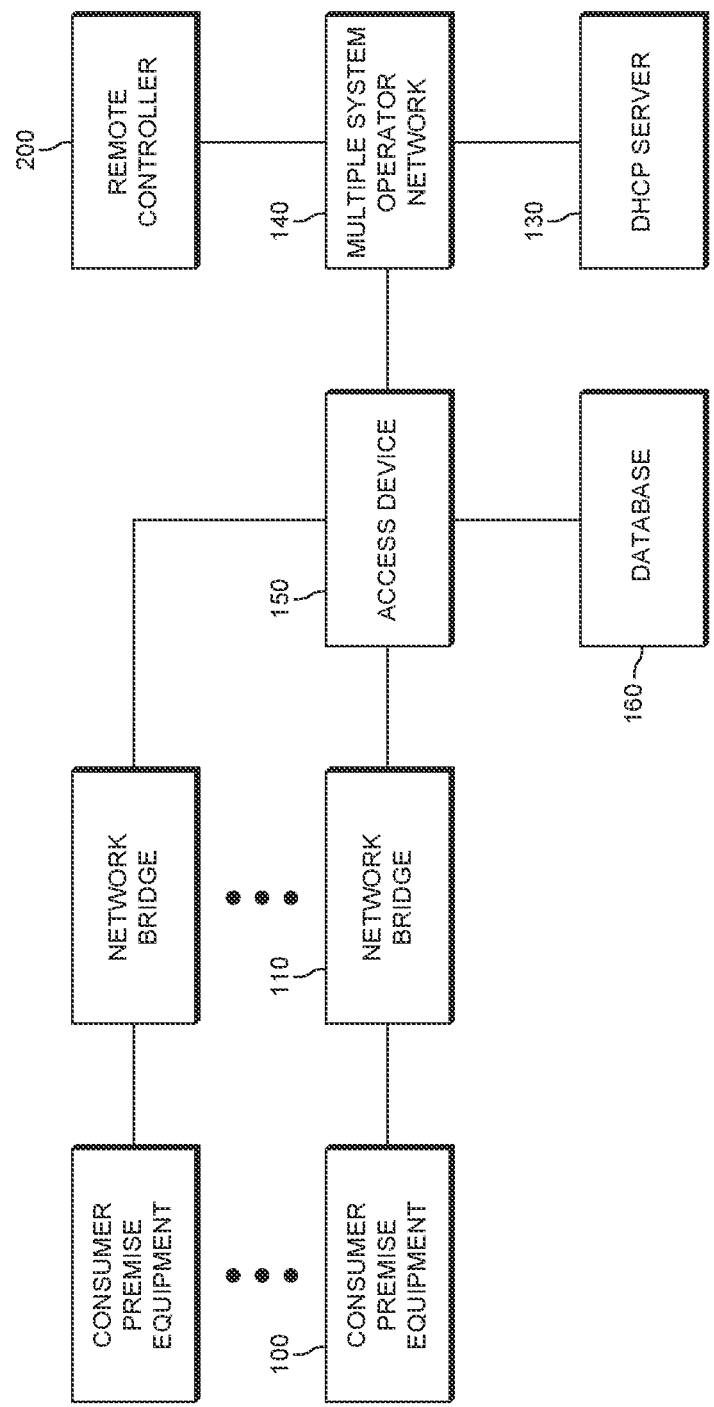
FIG. 2 illustrates a multiple system operator network together with a modified access device and a remote controller.

Referring to FIG. 2, with the removal of the support for the IPv4 DHCP leasequery protocol and the IPv4 DHCP bulk leasequery protocol, it was determined that a remote controller 200 may be included as part of a passive optical network system or a CMTS, or otherwise. The remote controller 200 would typically be included within a data center and may be provided with the forwarding table data (or data sufficient to create such a forwarding table) from the access device. Alternatively, the remote controller 200 may snoop the data each time the access device 150 obtains an IP lease based upon the DHCP messages, which includes the MAC address information and IP address information, in a manner sufficient to create such a forwarding table). In either case, the remote controller 200 has the information sufficient to create a forwarding table for a corresponding access device. Further, the remote controller 200 may have the information sufficient to create or otherwise provide a corresponding forwarding table for each of a plurality of corresponding access devices, each of which provides access for a corresponding set of network bridges and/or consumer premise equipment.

Figure 3:
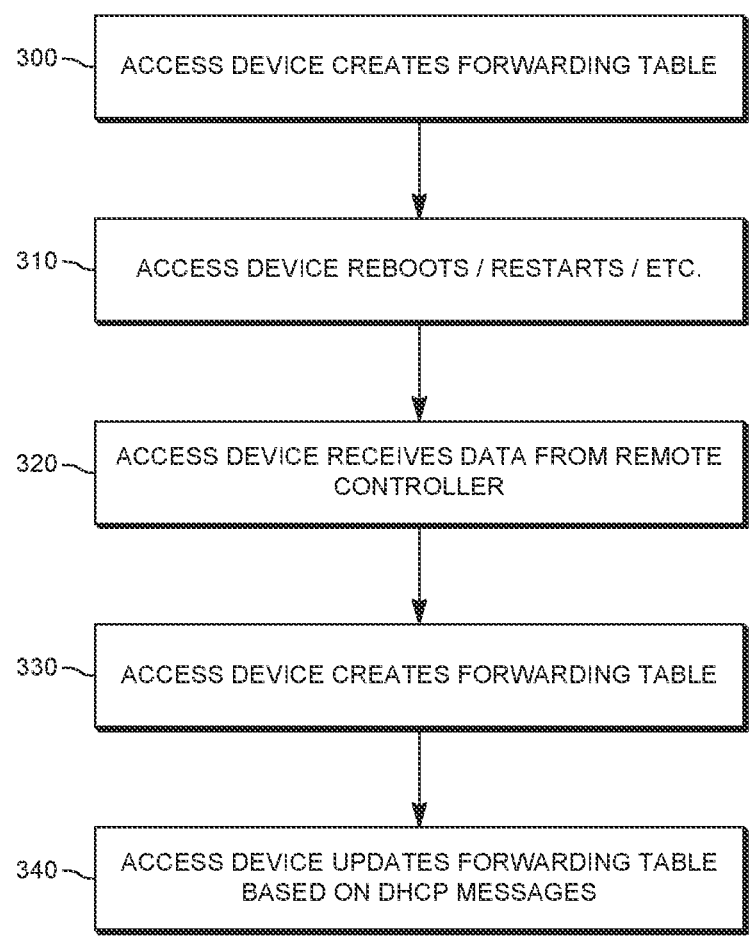
FIG. 3 illustrates a technique for rebooting the access device together with forming a forwarding table.

Referring to FIG. 3, the access device creates 300 a forwarding table associated with all of the consumer premise equipment and/or network bridges that the access device has in its network. The access device restarts 310 thereby losing the forwarding table. The access device 150 then, in response to a reboot (or otherwise), requests the data or is otherwise provided with the data from the remote controller 320, in a manner that doesn't require the IPv4 DHCP leasequery protocol or the IPv4 DHCP bulk leasequery protocol. The access device stores, builds, or otherwise creates a suitable forwarding table 330 in response to receiving the data from the remote controller 320. The access device updates the forwarding table 340 based upon future DHCP messages.

Figure 4:
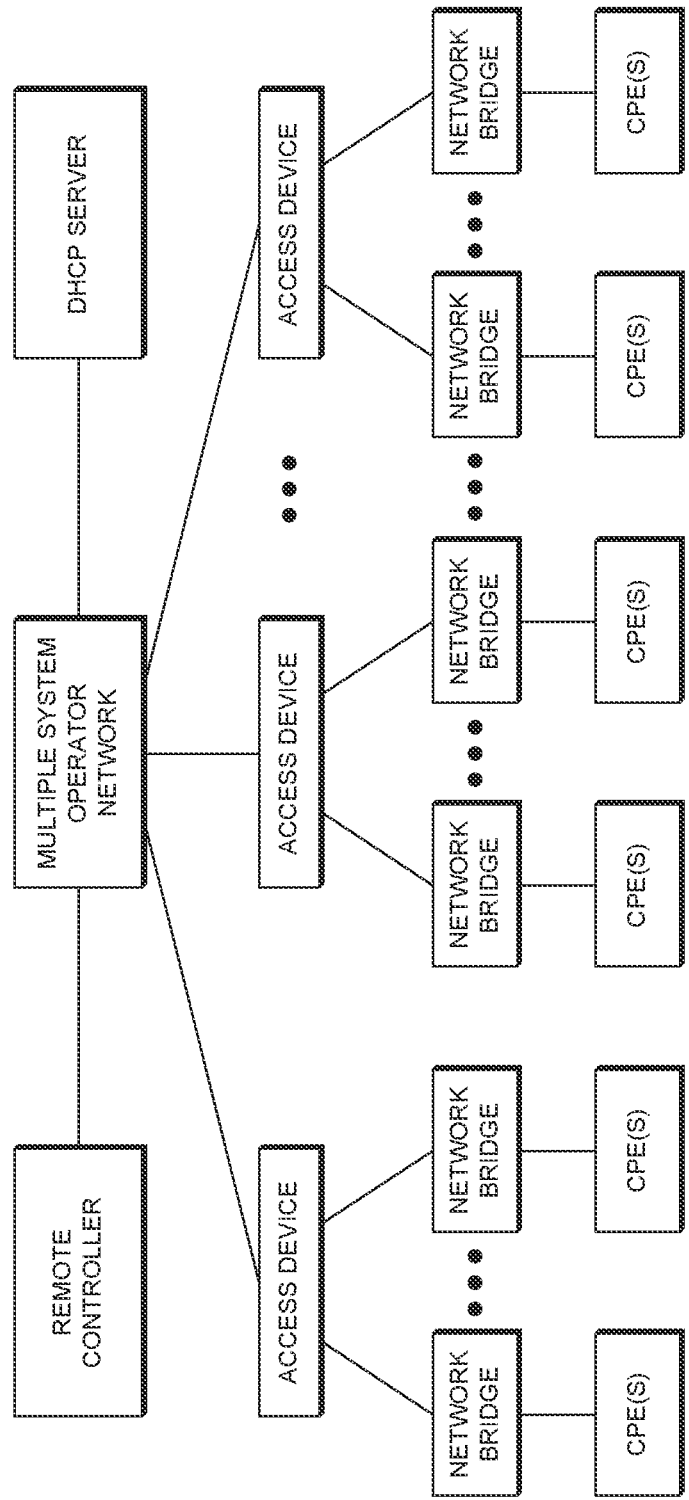
FIG. 4 illustrates a multiple system operator network together with multiple modified access devices and a remote controller.

Referring to FIG. 4, in many networks there exists a plurality of access devices, each of which provides among other things, a forwarding table for its associated customer premise equipment and/or network bridges. With a centralized remote controller, that includes data associated with multiple respective access devices, it may provide such data to the respective access device when requested or desired. In addition, the remote controller may also detect spoofing of an IP addresses by a device accessing the system where the corresponding MAC address does not correspond to an IP address associated with the particular access device. In other words, a device with a MAC address that attempts to access the network through a second access device that uses an IP address and/or MAC address associated with the first access device, may be determined as attempting to spoof the IP address, and accordingly denied access to the network. The same technique may be applied for MAC spoofing. The access may be denied by providing the access device to which the spoofing is occurring which may update its forwarding table to block the spoofed traffic.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A system that includes a processor comprising:
   (a) said system includes at least one of a computer premise equipment and a network bridge;
   (b) a system operator network that provides access for said at least one of said computer premise equipment and said network bridge to the Internet;
   (c) an access device with a first processor that includes a forwarding table that includes an association between an IP address assigned by a dynamic host configuration protocol server (DHCP) server and a medium access control (MAC) address of said at least one of said computer premise equipment and said network bridge to select an output interface for an input interface for forwarding a data packet,
      (1) from said at least one of said computer premise equipment and said network bridge to said Internet or
      (2) from said Internet to said at least one of said computer premise equipment and said network bridge;
   (d) said access device in response to said forwarding table not being accessible obtains replacement data sufficient to populate said forwarding table from a remote controller and not from a dynamic host configuration protocol server, in a manner that doesn't include either of an Internet Protocol Version 4 (IPv4) DHCP leasequery protocol nor an IPv4 DHCP bulk leasequery protocol;
   (e) said remote controller, including a second processor that is not interconnected with said first processor, maintaining said replacement data sufficient to populate said forwarding table;
   (f) said DHCP server, including a third processor that is not interconnected with said first processor nor said second processor, that assigns said IP address to said at least one of said computer premise equipment and said network bridge in response to a request.

2. The system of claim 1 further comprising said access device modifying said forwarding table based upon a DHCP message exchange between said DHCP server and said at least one of said computer premise equipment and said network bridge.

3. The system of claim 2 wherein said access device is configured in a manner such that said access device is not capable of making an IPv4 DHCP message to said DHCP server.

4. The system of claim 1 wherein said system includes said network bridge and said network bridge is a cable modem.

5. The system of claim 1 wherein said system includes said network bridge and said network bridge is an optical network unit.

6. The system of claim 1 wherein said access device does not maintain a set of host IPv4 addresses.

7. The system of claim 1 wherein said access device does not include the capability to support either of an IPv4 DHCP leasequery protocol nor an IPv4 DHCP bulk leasequery protocol.

8. The system of claim 1 wherein said access device supports at least one of an Internet Protocol Version 6 (IPv6) DHCP leasequery protocol and an IPv6 DHCP bulk leasequery protocol.

9. The system of claim 1 wherein said access device determines IP spoofing.

10. The system of claim 1 wherein said access device determines MAC spoofing.

11. The system of claim 1 wherein said system operator network supports a Data Over Cable Service Interface Specification DOCSIS protocol.

12. The system of claim 1 wherein said system operator network does not support a Data Over Cable Service Interface Specification DOCSIS protocol.

* * * * *